April 22, 1952     P. C. VIGNESS     2,593,816
GOPHER TRAP

Filed July 31, 1950     2 SHEETS—SHEET 1

Inventor
Peter C. Vigness

April 22, 1952 — P. C. VIGNESS — 2,593,816
GOPHER TRAP

Filed July 31, 1950 — 2 SHEETS—SHEET 2

Inventor
Peter C. Vigness

By Clarence A. O'Brien
and Harvey B. Jacobson
Attorneys

Patented Apr. 22, 1952

2,593,816

UNITED STATES PATENT OFFICE 2,593,816

GOPHER TRAP

Peter C. Vigness, Zumbrota, Minn.

Application July 31, 1950, Serial No. 176,873

1 Claim. (Cl. 43—88)

This invention relates to new and useful improvements and structural refinements in gopher traps, and the principal object of the invention is to facilitate catching and instantaneous killing of gophers in an efficient, humane manner.

The above object is achieved by the provision of a trap including a pair of coacting jaws which are adapted to be inserted in a hole in the ground, an important feature of the invention residing in the provision of trigger-actuated means for sustaining the jaws in an open position against the resiliency of a powerful spring which causes the jaws to quickly close when the trigger means are tripped by the animal.

Some of the advantages of the invention reside in its simplicity of construction, in its efficient and dependable operation, and in its adaptability to economical manufacture.

With the above more important objects and features in view and such other objects and features as may become apparent as this specification proceeds, the invention consists essentially in the construction and arrangement of parts as shown in the accompanying drawings, in which:

Figure 3 is a vertical sectional view taken substantially in the plane of the line 3—3 in Figure 1;

Figure 7 is a fragmentary perspective view of one of the handles together with its pivoted locking arm; and Figure 8 is a fragmentary perspective view of the second handle with its locking arm engaging detent.

Like characters of reference are employed to designate like parts in the specification and throughout the several views.

Figure 1:
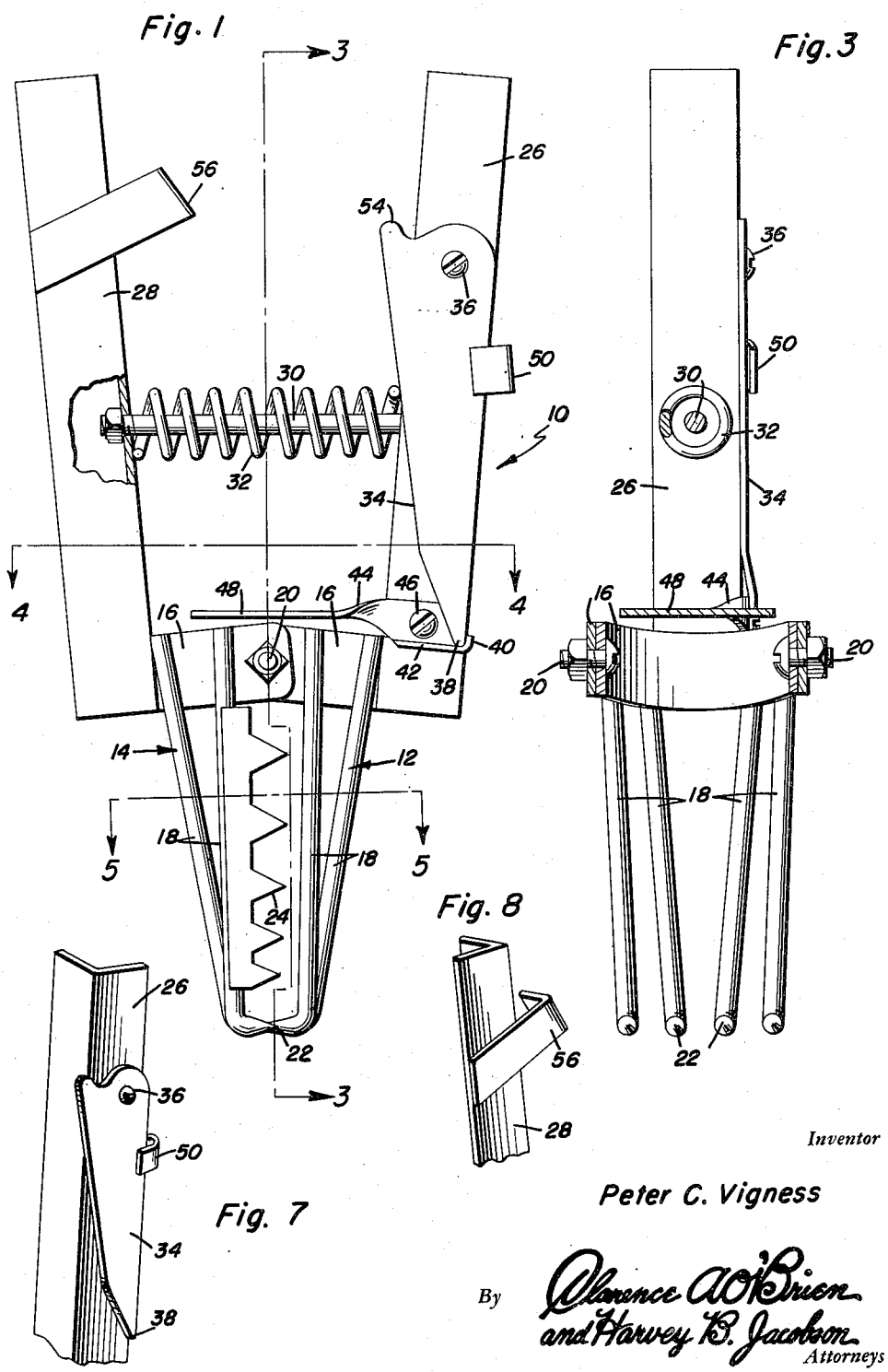
Figure 1 is a side elevational view of the invention, shown in its closed position and partially broken away so as to reveal its construction.

Referring now to the accompanying drawings in detail, the invention consists of a gopher trap which is designated generally by the reference character 10 and embodies in its construction a pair of coacting jaws 12, 14 which are similar in construction, each consisting of an arcuate top member or band 16 to which are secured a plurality of depending, downwardly convergent prongs 18. The top members or bands 16 of the two jaws are pivotally connected together at diametrically opposite points by a pair of coaxial screws 20, and it is to be noted that the lower end portions of the prongs 18 are inwardly angulated and terminate in opposing pointed extremities, as indicated at 22.

The prongs 18 are, of course, adapted to grip therebetween and kill an animal, and if desired a toothed rack 24 may be secured to each of the outer prongs on one of the jaws, so as to assist in catching and gripping the animal when the jaws are brought together.

By virtue of the pivots 20, the jaws 12, 14 are swingable toward and away from each other, and a pair of handles 26, 28 are rigid with the respective jaws 12, 14 by being secured to the upper portions or bands 16 of the jaws.

The handles 26, 28 preferably assume the form of angle bars, and a stud 30 extends through the two handles and carries a strong compression spring 32, the opposite ends of which bear against the respective handles and, by urging the same apart, tend to urge the jaws 12, 14 together, that is, to their closed position as shown in Figure 1.

Figure 6:
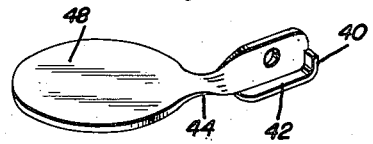
Figure 6 is a perspective view of a trigger used in the invention.

A locking arm 34, configurated substantially as shown, is pivoted, as at 36, to the handle 26 and the tapered lower end portion 38 of this arm is engageable with an upturned detent 40 provided on a flange 42 of a trigger 44 (see Figure 6).

The trigger 44 is pivoted, as at 46, to the handle 26 and is formed integrally with a depressible portion or platform 48 which is disposed above a substantially circular opening defined by the upper portions 16 of the two jaws 12, 14.

Figure 2:
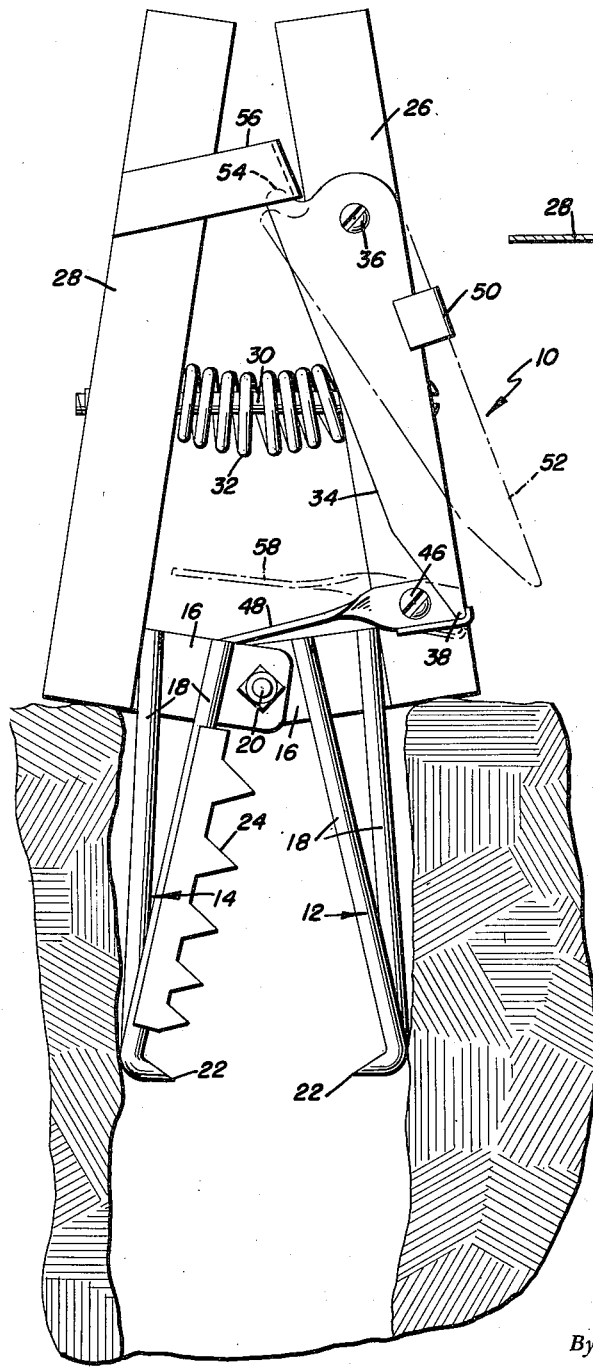
Figure 2 is a side elevational view of the invention inserted in a ground hole and shown in its open or set position.
Figure 4:
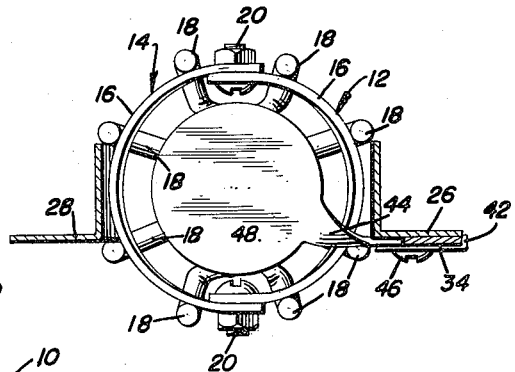
Figure 4 is a horizontal sectional view, taken substantially in the plane of the line 4—4 in Figure 1.
Figure 5:
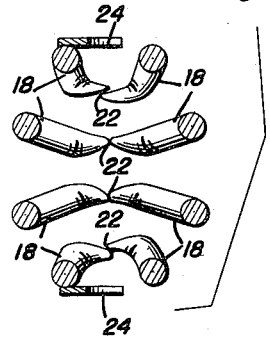
Figure 5 is a horizontal sectional view, taken substantially in the plane of the line 5—5 in Figure 1.

An angulated lug 50 is secured to the handle 26 to restrict the limit of pivotal movement of the locking arm 34 about the pivot 36, the restricted position of the arm being indicated at 52 in Figure 2.

The locking arm 34 is provided adjacent the pivot 36 thereof with a projecting tongue 54 which is engageable with an angulated lug or detent 56 secured to the handle 28, as shown in Figure 2.

When in operation, the trap is set by pressing the handles 26, 28 together, as shown in Figure 2, and engaging the tongue 54 with the detent 56 while the lower portion 38 of the locking arm 34 engages the detent 40 on the trigger 44. Under such circumstances, the detent 40 prevents the locking arm 34 from swinging to the release position shown at 52 and, consequently, the jaws 12, 14 are sustained in their open position against the resiliency of the spring 32.

However, after the jaws 12, 14 of the trap are inserted in a ground hole, as indicated in Figure 2, and a gopher attempts to emerge from the ground hole, the animal's contact with the platform 48 of the trigger 44 will cause the trigger to swing upwardly, as indicated at 58, thus disengaging the detent 40 from the portion 38 of the locking arm 34 and permitting the latter to swing to the position shown at 52, in which the tongue 54 is free to disengage itself from the detent 56, thus permitting the spring 32 to push the handles 26, 28 apart, resulting in the trapping of the animal between the jaws 12, 14.

It is believed that the advantages and use of the invention will be clearly apparent from the foregoing disclosure and, accordingly, further description thereof at this point is deemed unnecessary.

Having described the invention, what is claimed as new is:

In a gopher trap, the combination of a pair of coacting jaws having substantially semi-circular upper portions pivoted together at diametrically opposite sides thereof and defining a substantially circular opening, and sets of depending prongs secured to said upper portions and having inwardly angulated pointed lower extremities, first and second handles rigid with and projecting upwardly from the respective jaws, resilient means between said handles for urging the sets of prongs together, a locking arm pivoted intermediate the ends thereof to the first handle, a detent on the second handle in releasable engagement with the upper end of said arm whereby to sustain said sets of prongs in an open position against the action of said resilient means, and a depressible trigger pivoted to the first handle and releasably engaging the lower end of said arm, said trigger having a disc-shaped actuating portion extending over said opening.

PETER C. VIGNESS.

REFERENCES CITED

The following references are of record in the file of this patent:

UNITED STATES PATENTS

| Number | Name | Date |
|---|---|---|
| 588,167 | McWhirter | Aug. 17, 1897 |
| 689,324 | Rittenhouse | Dec. 17, 1901 |
| 1,924,241 | Hassler | Aug. 29, 1933 |

FOREIGN PATENTS

| Number | Country | Date |
|---|---|---|
| 4,349 | Great Britain | 1909 |